Jan. 5, 1954 J. W. BROWN Re. 23,763

BACKFILL TAMPER

Original Filed March 11, 1950

John W. Brown
INVENTOR.

BY Clarence A. O'Brien and Harvey B. Jacobson
Attorneys

Reissued Jan. 5, 1954

Re. 23,763

UNITED STATES PATENT OFFICE 23,763

BACKFILL TAMPER

John W. Brown, Westport, Conn., assignor to Gunderson-Taylor Machinery Company, Denver, Colo., a corporation of Colorado Original No. 2,551,925, dated May 8, 1951, Serial No. 149,134, March 11, 1950. Application for reissue May 7, 1953, Serial No. 353,706

12 Claims. (Cl. 121—1)

Matter enclosed in heavy brackets [ ] appears in the original patent but forms no part of this reissue specification; matter printed in italics indicates the additions made by reissue.

This invention relates to improvements in tamping devices of the type usually referred to as backfill tampers.

In construction jobs where dirt has been disturbed and must be replaced, as for example, when pipes have been laid in trenches, the soil when replaced must be carefully tamped, from the bottom up, as the trenches are filled. There are also many other places where tamping is necessary.

There are on the market today several mechanical tampers, some of which are operated by compressed air. Such tampers are so constructed that one man can operate a single tamper only. Where large areas are to be tamped, the services of many men are required in order to expedite the job.

It is the object of this invention to produce a holder to which several pneumatic tampers may be attached, preferably three, and of such construction and design that one man can operate an assembly of three tampers and thereby accomplish three times as much work in a unit of time as he could operating a single tamper.

Another object is to produce a holder of such construction that it provides an air reservoir with which all of the tampers communicate and which assures a uniform air supply and pressure to all of the tampers, thereby assuring optimum operation of all the tampers.

A further object is to produce a holder for pneumatic tamping devices of such a construction and design that a plurality of tamping devices can be readily attached thereto and/or removed therefrom.

*A still further important object is to provide for mounting a plurality of pneumatic tamping devices thereon in a readily detachable manner and wherein conventional tamping devices of different sizes may be supported as desired.*

The above and many other objects that may become apparent as the description proceeds are attained by means of a construction and arrangement of parts that will now be described in detail, for which purpose reference will be had to the accompanying drawing in which the invention is illustrated, and in which.

Figure 1:
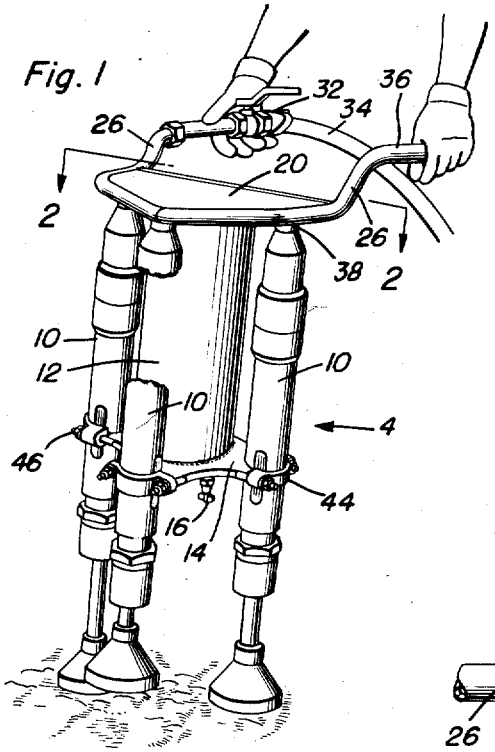
Figure 1 is a perspective view showing the invention fully assembled and the manner in which it is employed.
Figure 2:
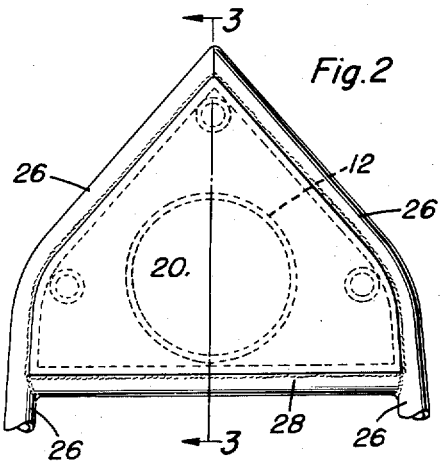
Figure 2 is a plan view looking downwardly through plane 2—2, Figure 1.

Referring now to the drawing, reference numeral 10 designates a well-known type of pneumatic backfill tamper which forms no part of the invention except to the extent that it is an element in the combination comprising the holding device.

Figure 3:
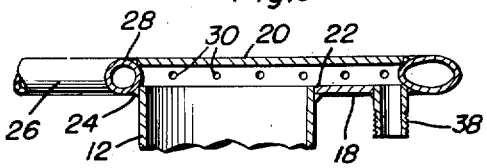
Figure 3 is a section taken on line 3—3, Figure 2.
Figure 4:
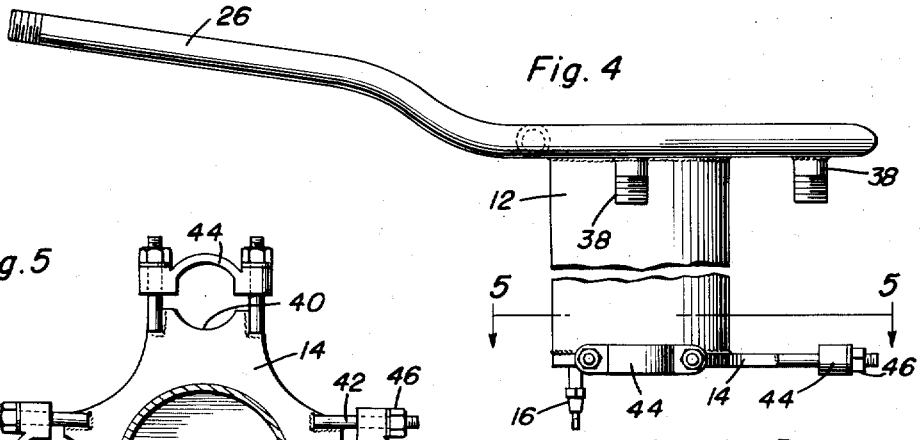
Figure 4 is a side elevation, partly broken away, with the tampers removed, looking in the direction of arrow 4 Figure 1.

The tamper holder which forms the subject of this invention comprises a combined tamper holder and surge preventing reservoir provided with means for *removably* attaching the tampers thereto. Reference numeral [11] *12* represents a cylindrical reservoir having a bottom [12] *14* provided with a drain cock [13] *16*. Attached to the upper open end of the reservoir is a hollow top of substantially triangular shape (the shape may be rectangular or even round). The top is formed from two steel plates [14] *18* and [15] *20*. Plate [14] *18* has a central opening [16] *22* of the proper size to receive the upper end of the reservoir to which it is secured by welding as indicated at [17] *24*. Plates [13] *18* and [14] *20* are of the same size and shape and are held in spaced relation by pipes [18] *26* and [18a] *28* to which their edges are secured by welding as shown in Figure 3. Pipes [18] *26* are provided with openings [19] *30, see Figure 3,* to provide communication between the interiors of the pipes and the reservoir.

Pipes [18] *26* extend beyond pipe [18a] *28* and one is provided with a valve [20] *32* which is connected with a suitable source of compressed air by a hose [21] *34*; the other pipe [18] *26* terminates in a handle [22] *36* and its end is closed by a suitable cap (not shown).

Figure 5:
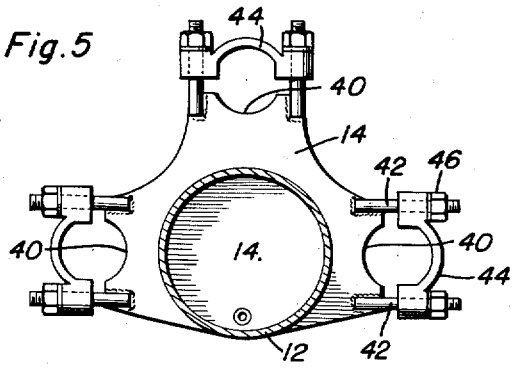
Figure 5 is a section taken on line 5—5, Figure 4.

In the triangular design shown, pipe nipples [23] *38* are welded to the bottom plate [14] *18* and are in communication with the interior of the hollow top. Bottom [12] *14* is formed from a plate of the shape shown in Figure 5 and has three *lateral* projections, the outer ends of which terminate in concave portions [24] *40*. Bolts [24] *42* are welded to the plate, one at each end of each concave recess [24] *40*. A bowed clamp [25] *44* is attached to each pair of bolts and is held in adjusted position by means of nuts [26] *46*.

The tamping devices are provided at their upper ends with threaded openings for the reception of the pipe nipples to which they are threaded and are held in place by the bowed clamps [25] *44*, all as shown in Figure 1.

In operation the assembly is grasped as shown in Figure 1, and when the valve is opened air enters the reservoir through openings [19] *30*. Air from the reservoir flows to the tampers through nipples [23] *38* and the tampers begin functioning. Since the tampers usually vary as to their exact rate of reciprocation their tamping strokes are staggered.

The device can be moved over the surface and since each assembly has three tampers, one man can do three times as much work per unit of time. Although three tampers have been found to be satisfactory, it is evident that a greater *or a lesser* number may be used if desired.

From the above it will be apparent that the holder that forms the subject of this invention is so constructed that pneumatic tampers now made *in various sizes* and marketed by others can be assembled into a multiple unit [which] *and* due to the reservoir positioned adjacent the tampers, the reserve air supply thus provided assures uniform operation.

Having described the invention, what I claim as new is:

1. A holding device for a plurality of pneumatic tamping devices comprising a central airtight vessel forming a reservoir for compressed air, a plurality of clamps carried by the vessel for attaching thereto an equal number of tampers, means comprising a tubular member communicating the interior of the vessel with each tamper, a tubular air supply pipe in communication with the vessel, an air flow control valve in the pipe, and handle means for guiding the assembly.

2. A device in accordance with claim 1 in which the vessel has a top comprising two spaced plates of extended area sealed about their edges, the vessel being in communication with the space between said plates, the lower plate having tubular nipples attached thereto, in communication with the space between the plates, and in which the clamps are of the two-part bolt operated type.

3. A device in accordance with claim 1 in which the vessel is an elongated cylinder whose lower end is closed by means of a plate having a plurality of two-part bolt operated clamps and in which the top of the cylinder is closed by a cover comprising two spaced metal plates of extended area sealed about their edges forming an airtight chamber communicating with the vessel through an opening in the lower plate, the tubular members communicating with the chamber between the plates.

*4. A holder for a pneumatic tamping device comprising an airtight vessel forming a reservoir for compressed air, a pair of projections extending laterally and horizontally from the side of said vessel and each having a seat spaced laterally and horizontally from said vessel, means cooperating with said seats for securing a pneumatic tamper to said projection against lateral horizontal movement relative thereto, means including a tubular member communicating the interior of the vessel with said tamper, means for supplying compressed air to said tamper, control means for said last mentioned means.*

*5. The combination of claim 4 including a handle attached to said communicating means, said handle constituting part of said compressed air supplying means.*

*6. A holder for a pneumatic tamping device comprising an airtight vessel forming a reservoir for compressed air, a projection extending laterally from the side of said vessel and having a seat, means cooperating with said seat for centering a pneumatic tamper with respect to said seat and engaging a tamper for preventing lateral movement of the tamper relative to said seat, means including a tubular member communicating the interior of the vessel with said tamper, means for supplying compressed air to said tamper, control means for said last mentioned means, said vessel having top and bottom closure members each extending laterally thereof, said projection being mounted upon said bottom closure member, said tubular member being dependingly mounted upon said top closure member whereby said tamper may have its upper end connected to and supported by said tubular member and intermediate its ends may be secured by said means cooperating with said seat.*

*7. A holder for a pneumatic tamping device comprising an elongated substantially vertical centrally disposed portable and freely movable body comprising a reservoir supplying air to a plurality of tampers, upper and lower members secured to the upper and lower ends of said body and extending laterally and horizontally therefrom, a plurality of clamps mounted upon and extending laterally and horizontally from said lower member, a plurality of pneumatic tampers each secured to said body by one of said clamps, elements upon the laterally projecting portions of the upper member attached to said tampers in communication with the reservoir and supplying air to said tampers.*

*8. The combination of claim 7 wherein said elements are attached to and are disposed vertically above the upper ends of said tampers.*

*9. The combination of claim 7 wherein said elements are attached to the upper ends of said tampers and said clamps embrace said tampers intermediate their ends.*

*10. The combination of claim 7 including a handle secured to and disposed about the periphery of said upper member.*

*11. A holder for a pneumatic tamping device comprising an air tight vessel forming a reservoir for compressed air, a plurality of pairs of projections extending laterally and horizontally from the side of said vessel and each having a seat spaced laterally and horizontally from said vessel, means cooperating with each pair of seats for securing a pneumatic tamper to each pair of projections against horizontal lateral movement relative thereto, means including a plurality of tubular members communicating the interior of the vessel with said tampers, means for supplying compressed air to said tampers, control means for said last mentioned means.*

*12. The combination of claim 4 including means for venting the lower portion of said vessel to the atmosphere.*

JOHN W. BROWN.

References Cited in the file of this patent or the original patent

UNITED STATES PATENTS

| Number | Name | Date |
|---|---|---|
| 567,725 | Rinsche | Sept. 15, 1896 |
| 604,480 | Rhodes | May 24, 1898 |
| 659,418 | Pickles | Oct. 9, 1900 |
| 707,920 | Haeseler | Aug. 26, 1902 |
| 1,585,740 | Saulia | May 25, 1926 |
| 2,136,315 | Pettit | Nov. 8, 1938 |
| 2,497,682 | Mertz | Feb. 14, 1950 |

FOREIGN PATENTS

| Number | Country | Date |
|---|---|---|
| 400,467 | Germany | Aug. 19, 1924 |